Nov. 3, 1925.
G. C. DAVISON
TRACTOR
1,560,042
Original Filed Nov. 24, 1919   4 Sheets-Sheet 1
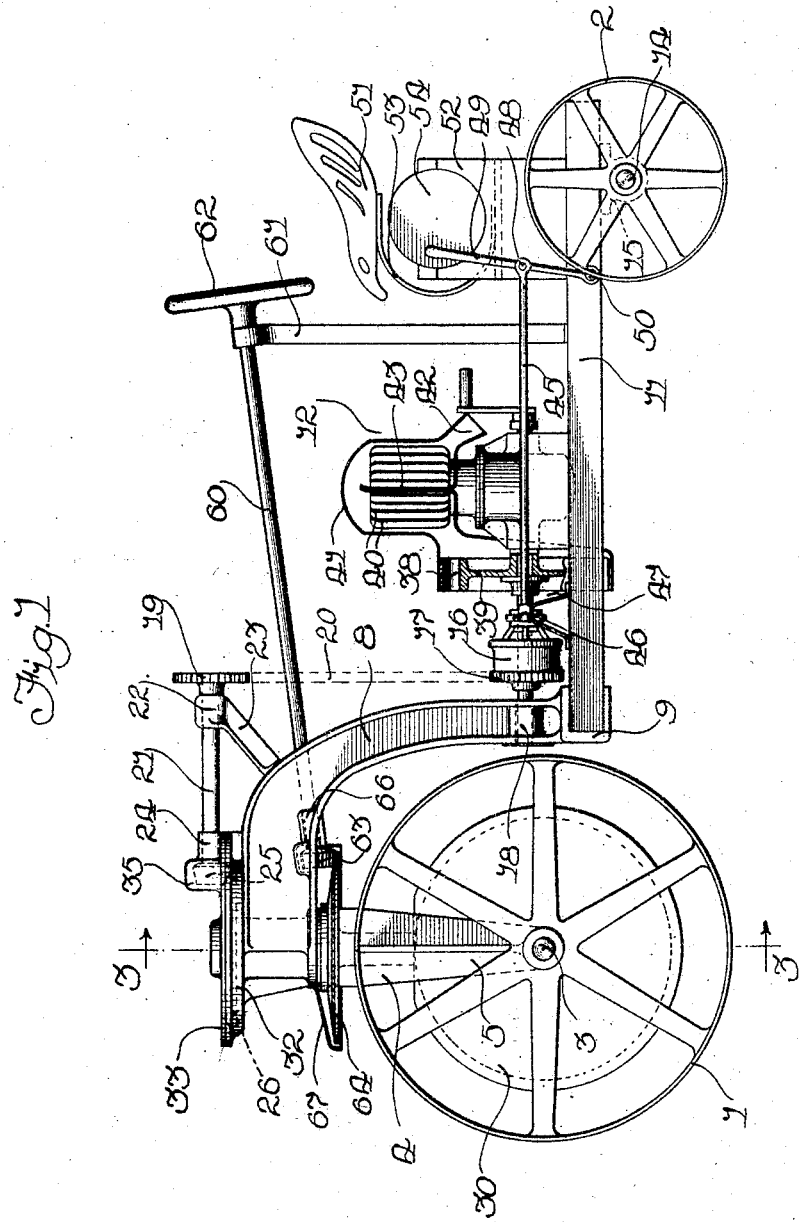
Inventor
Gregory C. Davison
By Brown Boettcher & Dienner
Attorneys Nov. 3, 1925.
G. C. DAVISON
1,560,042
TRACTOR
Original Filed Nov. 24, 1919    4 Sheets-Sheet 2
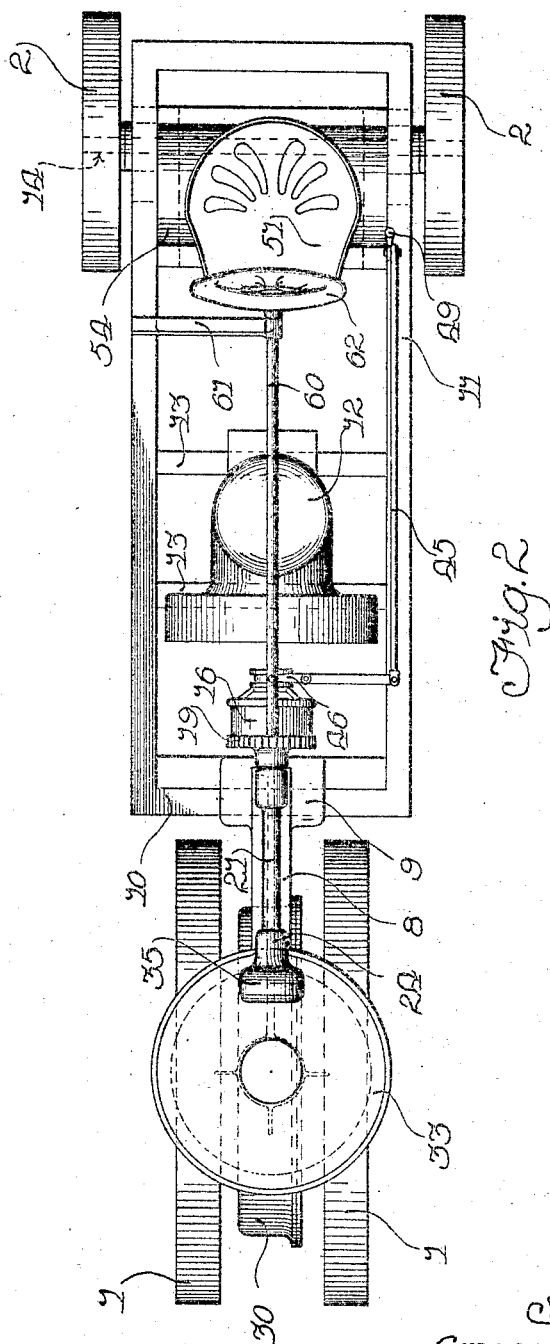
Inventor
Gregory C. Davison
By Brown Boettcher Dienner
Attorneys

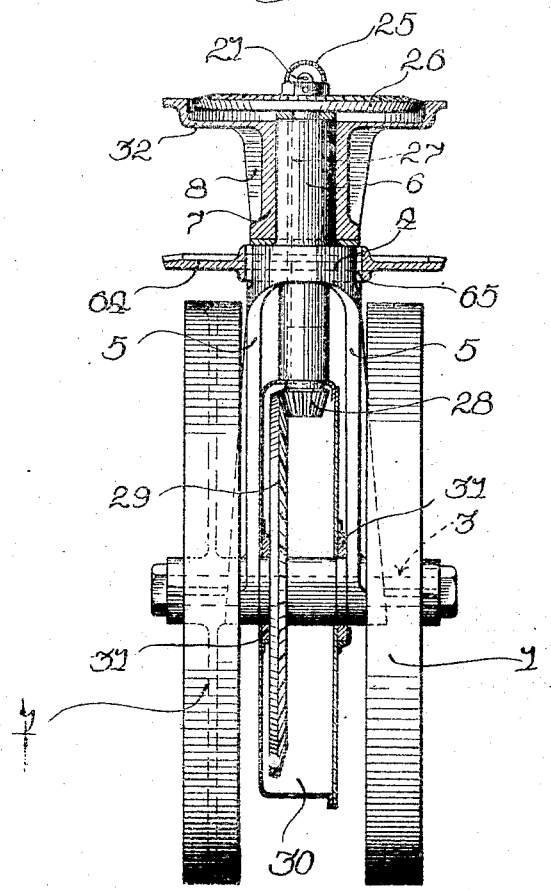

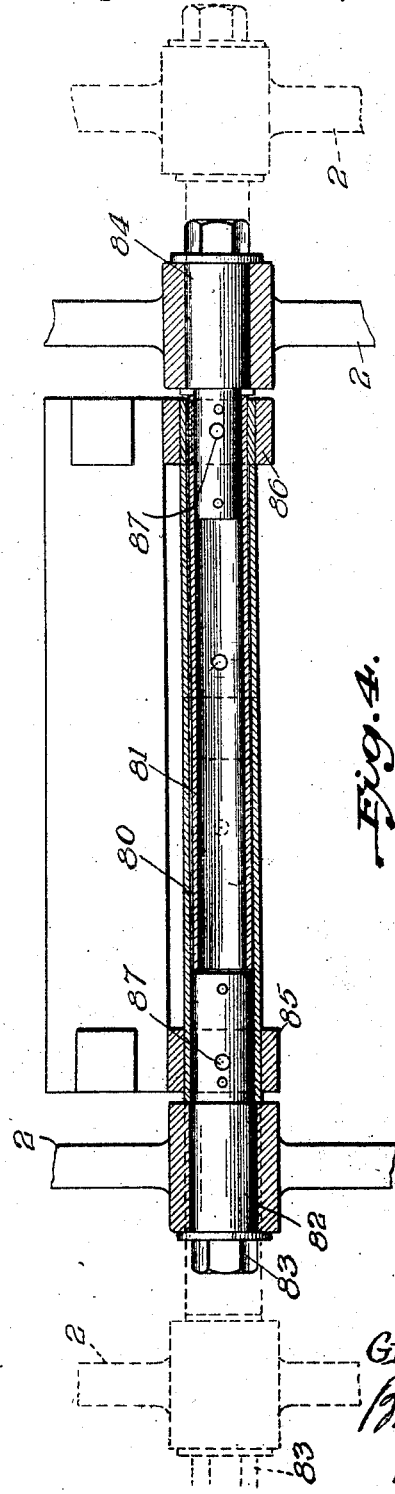

Patented Nov. 3, 1925.

1,560,042

UNITED STATES PATENT OFFICE.

GREGORY C. DAVISON, OF NEW LONDON, CONNECTICUT.

TRACTOR.

Application filed November 24, 1919, Serial No. 340,229. Renewed April 5, 1924.

*To all whom it may concern:*

Be it known that I, GREGORY C. DAVISON, a citizen of the United States, residing at New London, in the county of New London and State of Connecticut, have invented a certain new and useful Improvement in Tractors, of which the following is a full, clear, concise, and exact description, reference being had to the accompanying drawings, forming a part of this specification.

My invention relates to tractors and although particularly concerned with an improved small size tractor especially well adapted for agricultural work, it will be hereinafter apparent that the features of the present invention are in no wise limited to vehicles of a particular size or for a particular class of service.

Stated generally, the object of my invention is the provision of a tractor of simple, durable, and rugged construction at low cost, which will be capable of simple, reliable and effective control and maneuvering both as to driving and steering and to this end I have provided various novel improvements organized in such manner as to adapt the vehicle to the performance of its work in a superior and more efficient manner than has been possible heretofore. I provide whereby the steering mechanism and reversing mechanism of the tractor is arranged to be controlled from a common steering wheel arranged for convenient access from the driver's seat. To this end a combined steering and driving wheel (or wheels) is mounted for complete rotation with relation to the running gear or chassis of the tractor, reversing the direction of movement of the tractor being accomplished by turning this wheel or wheels, as the case may be, through substantially one half revolution, or 180 degrees.

In addition to the provision whereby the direction of the movement of the vehicle may be reversed in an extremely simple manner and the provision of a great flexibility in the steering function, some of the more salient features of my invention are the provision of a novel driving mechanism and the provision of a simple, efficient and improved chassis.

In order that those skilled in the art may be fully acquainted with the nature and scope of my invention I shall describe a specific embodiment of the invention in connection with the accompanying drawings, wherein:

Figure 1 is a side elevational view of a tractor embodying my invention;

Figure 2 is a plan view of the same;

Figure 3 is a vertical, transverse sectional view taken substantially on the line 3—3 of Figure 1; and Figure 4 is an axial sectional view of the rear axle.

Referring to the drawings, my improved tractor comprises two relatively large front traction or driving wheels 1—1 and a pair of rear wheels 2—2. The driving wheels 1—1 are splined, keyed or otherwise fixed upon the opposite ends respectively of the front axle or shaft 3 which front axle 3 is rotatably mounted intermediate the wheels 1—1 in a fork 4.

This front fork 4 comprises a pair of downwardly extending arms 5—5 and an upright hollow spindle or standard 6, received or journaled in a bearing sleeve 7 provided in the outer or forward end of an upwardly arched arm 8. The opposite or inner end of the arched arm 8 is secured through a channel portion 9 carried thereby, to the forward cross or transverse sill portion 10 of the main vehicle frame 11. This main frame 11 is preferably, although not necessarily, rectangular shaped, comprising side members or longitudinal sill portions, transverse sill portions at the front and rear and suitable cross girths 13, which cross girths 13 support an engine 12 of any suitable type.

The rear wheels 2—2 of the vehicle are mounted upon the opposite ends of a telescoping axle shown in Fig. 4 and supported in suitable bearings 85 and 86 bolted or otherwise suitably secured to the side or longitudinal sill members of the main frame 11. The construction of the rear axle is preferably, although, of course, not necessarily of telescopic design as illustrated in Figure 4. There are two main features derived from this type of construction which provide means whereby the road tread may be varied either through one or both of the wheels 2. With reference to Figure 4 the rear axle is shown to be constructed of two tubes 80 and 81 of such diameters that one will readily telescope or slide in the other with but a small amount of clearance between the tubes. The tube 80 extends to one of the wheels 2, in this particular instance the left hand wheel. The axle proper 82 comprises a steel bar extending inside and secured in the tube 80. The wheel 2 is free to revolve on the axle 82 being held in place on the axle by means of a nut 83 and suitable washer. The opposite, or right hand wheel 2 is secured in like manner to an axle proper 84 which in turn is secured within the tube 81, which tube constitutes one half of the axle proper.

The axle thus constructed is supported in two bearings 85 and 86. These bearings are in turn secured to the frame of the tractor. The rear axle tubes 80 and 81 are in turn made fast to the supports or bearings 85 and 86 respectively by pins 87 which pass through the supports or bearings and the tubes 80 and 81. In this manner and as shown in full lines the rear axle is complete. The tread of the rear wheels in this position is the minimum.

For reasons which may be necessary in straddling rows of vegetables, etc. it will be desirable to pull out or adjust the wheel either on one side of the frame or both sides a certain distance in order that the rows of produce will not be harmed by the wheels. For this reason a series of holes are drilled at different points in each of the tubes 80 and 81, which constitute the rear axle, in order that the pins 87 may be withdrawn and the rear axles then adjusted outwardly to the desired position and the pins 87 again inserted. Again, if desirable while plowing or otherwise working across side hills, the wheel on the down hill side may be pulled out to its limit, thereby increasing the stability of the machine which might otherwise tend to capsize. The wheels extended to their maximum tread, each wheel being withdrawn a like distance on either side is shown by the dotted lines. The rear wheels 2—2, which serve to guide and steady the machine, support the minor part of the weight thereof. The major portion of the weight of the tractor is designed to come on the front driving wheels 1—1 as by so doing the tractive effort or effect of these driving wheels will be increased.

The power plant of the vehicle consists, in this particular instance, in a twin-cylinder, air cooled engine 12 which furnishes power to the driving wheels 1—1 of the vehicle. The fly-wheel end of the engine 12 is connected directly with a clutch 16 as shown. The forward end of the clutch 16 carries a driving sprocket 17. The shaft continues on and enters a suitable bearing sleeve 18 provided in the upwardly arched arm 8. The driving sprocket 17 and a driven sprocket 19 (see Figure 1) are connected by a suitable chain 20 which when the clutch 16 is in drives a secondary shaft 21 through the sprocket 19 fixed thereupon.

The cooling of the engine is accomplished by a circulation of air through the plates 38 provided about the periphery of the flywheel 39 of the engine. The cylinder of the engine, which cylinder is provided with a plurality of radial cooling fins 40, is encased in a casing or housing 41. The housing 41 is provided with an outlet 42 and a baffle wall 43, whereby the air upon entering through the plates 38 is caused to circulate through the casing 41 substantially as indicated by the arrows and out through the discharge opening 42. The engine may be cooled by a blast of air produced from a fan if so desired.

The clutch 16 is controlled through a clutch operating shaft 45 pivotally connected at its forward end with a suitable shifting yoke 46. A bracket member 47 mounted upon the main frame 11 supports the forward end of the clutch operating shaft 45 as shown in Figure 1. The rear or opposite end of this clutch operating shaft is pivotally connected as at 48 with a clutch operating hand lever 49. The hand lever 49 is pivoted at 50 to the vehicle frame 11 and extends upwardly so as to be easily accessible from the driver's seat 51.

The driver's seat 51 is supported from a frame 52 by means of a suitable spring 53 as shown. The frame 52, which is in turn carried by the main frame 11, supports the gasoline tank 54 at an elevation sufficiently high to insure a good flow of gas by gravity to the carburetor. A suitable drawbar for use in attaching farm tools or wagons may be readily secured to the rear of the frame 11.

The secondary shaft is supported adjacent its rear or after end in a bearing sleeve 22 provided in the outer end of a bracket arm 23, which bracket arm 23 is mounted on the upwardly arched arm 8 of the vehicle and adjacent its forward end in a bearing member 24. The forward end of this shaft 21 is provided with a driving bevel pinion 25, which pinion 25 meshes with a driving bevel gear 26 fixed upon the upper end of a shaft 27. The shaft 27 extends through the upright hollow spindle or standard 6 of the front fork 4 and is provided at its lower end with a bevel pinion 28 as clearly shown in Figure 3. This bevel pinion 28 meshes with and drives the main driving gear 29 of the vehicle, which main driving gear 29 is splined, keyed or otherwise fixed upon the front axle or shaft 3 intermediate the downwardly extending arms 5—5 of the front fork 4.

The main driving gear 29 and pinion 28 are encased in a casing 30, which casing 30 provides protection for these gears and also holds the lubricating oil which insures that the gears are always well lubricated. Suitable dust or oil washers 31 are provided adjacent the axial openings on each side of the gear casing 30 to exclude dust and other foreign substances from the interior of the casing and to prevent the leakage of oil. The forward end of the upwardly arched arm 8 of the vehicle, in addition to providing a bearing sleeve 7 for the front fork 4, provides a housing 32 for the driving gear 26. The housing 32 is provided with a suitable cover 33 fitting over the gear 26. This cover 33 in addition to providing the bearing 24 for the forward end of the secondary shaft 21, provides a housing 35 for the driving bevel pinion 25.

The steering of the tractor of my invention is accomplished by rotating the front fork 4 about the axis of the spindle 6 thereof by means of a steering shaft 60. The rear end of the shaft 60 bears in a bracket member 61 mounted in an upright position upon the frame 11 and is provided with a steering wheel 62 located for convenient access from the driver's seat 51. The forward end of the shaft 60 is supported in a bearing 66 provided in the upwardly arched arm 8 and carries a steering pinion 63, which steering pinion 63 meshes with a steering gear 64 splined or otherwise fixed upon the fork 4 as shown at 65 in Figure 3. The steering gear 64 is encased in a casing 67 secured in any suitable manner to the forward end of the arm 8. The pinion 63 is encased partly by the housing 67 and partly by a cooperating pocket or depressed portion provided in the arm 8.

In the event that it is desired to reverse the motion of the tractor, or in other words back up, the steering wheel 62 is turned either right or left hand as is most convenient to the operator until the front fork 4 has made one half a revolution or 180 degrees. By this operation the bevel driving gear 29 is rotated about the pinion 28 from the left hand side thereof (Figure 3) to the right hand side. Although the direction of rotation of the bevel gear 29 and wheels 1—1 will remain the same, the forward portions of the wheels will face the vehicle instead of ahead; that is, the direction of rotation of the wheels 1—1 will be changed relative the tractor with the result that the direction of movement of the tractor will be reversed.

The reversing or backing up of the tractor, or in other words, the rotation of the front fork 4, can be accomplished while the tractor is still going ahead; in other words, it is not necessary to throw out the clutch to reverse the tractor as has been heretofore necessary. While the tractor will swing out to a certain extent from its straight course in this reversing operation until the wheels or fork have been rotated substantially one quarter of a revolution, upon completing the other quarter revolution the tractor will back up in the same radius that it made while turning the first one quarter revolution or 90 degrees.

The engine of my improved tractor is preferably provided with a suitable pulley which gives sufficient power to drive (when belted) corn shellers, churners, wood saws, cider mills and presses and various other tools and machinery found on the farm.

I do not intend to be limited to the precise details of construction shown and described, as it will be apparent to those skilled in the art that modifications may be made in the embodiment of the invention without departing from the invention as defined in the following claims:

I claim:

1. In a machine of the class described, a relatively low main frame, an arched arm projecting forwardly and upwardly from the forward end of said relatively low main frame, a bearing head adjacent the forward end of said arched arm, a wheel carrying member revolvably journaled in said bearing head, a driving wheel carried by said member, a relatively large gear connected to drive said wheel, a shaft extending axially thru the wheel carrying member, said shaft having a relatively small pinion on its lower end in driving engagement with said relatively large gear, a relatively large gear on the upper end of said shaft, a second shaft arranged normal to said first shaft and having a relatively small pinion at its forward end in driving engagement with the relatively large gear on the upper end of said first shaft, a sprocket at the opposite end of said second shaft, a motor mounted on the main frame with its drive shaft extending longitudinally and journaled at its forward end in the arched arm projecting from the relatively low main frame, a clutch on said shaft, a sprocket on said clutch, a chain connecting said last named sprocket with the sprocket on said second shaft, a gear on the wheel-carrying member, and a shaft having a pinion at its forward end in mesh with said gear, said shaft extending back between runs of the chain connecting the motor shaft and the second shaft, and being adapted for manually turning the wheel-carrying member to steer the machine and reverse the direction of movement thereof.

2. In a machine of the class described, a relatively low main frame having an arched arm projecting forwardly and upwardly from the forward end thereof, a bearing head adjacent the forward end of said arm, a wheel-carrying member revolvably journaled in said bearing head, an axle carried by said wheel carrying member, a pair of drive wheels on said axle, a relatively large gear on said axle between and connected to drive said drive wheels, a shaft extending between said wheels and having a relatively small pinion in mesh with said relatively large gear, a relatively large gear on said shaft, a motor mounted on the main frame with its main drive shaft extending longitudinally and journaled at its forward end in the arched arm, a sprocket on said shaft, an intermediate shaft between said main motor shaft and said first shaft, a relatively small pinion on said intermediate shaft in mesh with the relatively large gear of said first shaft, a sprocket on said intermediate shaft and a chain connecting the sprocket on the intermediate shaft with the sprocket on the main motor shaft.

3. In a machine of the class described, a relatively low main frame having an arched arm projecting forwardly and upwardly from the forward end thereof, a bearing head adjacent the forward end of said arm, a wheel carrying member revolvably journaled in said bearing head, an axle carried by said wheel-carrying member, a pair of drive wheels on said axle, a relatively large gear on said axle between and connected to drive said drive wheels, a shaft extending between said wheels and having a relatively small pinion in mesh with said relatively large gear, a relatively large gear on said shaft, a motor mounted on the main frame with its main drive shaft extending longitudinally and journaled at its forward end in the arched arm, a clutch on said shaft, a sprocket on said clutch, a chain connecting said last named sprocket with the sprocket on the intermediate shaft, a driver's seat on the main frame and means accessible from said seat for contolling said clutch and thereby the transmission of power from the motor to the drive wheels of the machine.

4. In a machine of the class described, a relatively low main frame, an arched arm secured to the forward end of said main frame, said arched arm projecting forwardly and upwardly beyond the forward end of said main frame, a bearing head adjacent the forward end of said arm, a wheel carrying member revolvably journaled in said bearing head, a driving wheel carried by said wheel carrying member and arranged forwardly beyond the main frame, said wheel carrying member and said driving wheel being supported solely by the journaling of said wheel carrying member in said bearing head, a motor mounted on the main frame with its drive shaft extending longitudinally forwardly and journaled at its forward end in the arched arm, a clutch on said shaft, a sprocket on said clutch, an intermediate driving shaft between the motor shaft and the drive wheel, a sprocket on said intermediate shaft, and a driving chain connecting said sprockets.

5. In a machine of the class described, a relatively low main frame, a separate arched arm attached to and projecting forwardly and upwardly beyond the forward end thereof, a bearing head adjacent the forward end end of said arched arm, a wheel carrying member revolvably journaled in said bearing head, a pair of driving wheels carried by said wheel carrying member and arranged forwardly beyond the main frame, a gear arranged between and connected to drive said driving wheels, a shaft extending co-axially with the axis of rotation of the wheel carrying member said shaft having a pinion in driving engagement with said driving gear, a gear on said shaft, a second shaft having a pinion in driving engagement with said gear and a sprocket, a motor mounted on the main frame with its main drive shaft extending longitudinally and journaled at its forward end in the separate arched arm attached thereto, a clutch on said shaft, a sprocket on said clutch, and a chain connecting said last named sprocket with said first sprocket.

6. In a machine of the class described, a relatively low main frame having an arched arm projecting longitudinally and upwardly therefrom, a bearing head adjacent the forward end of said arm, a wheel carrying member revolvably journaled in said bearing head, an axle carried by said member, a pair of drive wheels on said axle, a motor mounted on the main frame, a shaft journaled on the arched arm, a driving connection between the motor and said shaft, a shaft journaled in the wheel carrying member and having driving connection at its upper end with said first shaft, a driving connection between the lower end of said last shaft and the wheels, and means carried by the wheel carrying frame and disposed between the wheels for enclosing said last driving connection.

In witness whereof I hereunto subscribe my name this 18 day of November, 1919.

GREGORY C. DAVISON.